United States Patent
Baulig et al.

(10) Patent No.: US 9,580,646 B2
(45) Date of Patent: Feb. 28, 2017

(54) METHOD FOR TREATING A STEEL BAND OR PLATE PROVIDED WITH A METAL COATING WITH AN AFTER-TREATMENT AGENT, AND A STEEL BAND OR PLATE PROVIDED WITH A METAL COATING

(71) Applicant: THYSSENKRUPP RASSELSTEIN GMBH, Andernach (DE)

(72) Inventors: Harold Baulig, Mülheim-Kärlich (DE); Reiner Sauer, Neuwied (DE); Helmut Oberhoffer, St. Johann (DE); Martin Schlupp, Bendorf (DE)

(73) Assignee: THYSSENKRUPP RASSELSTEIN GMBH, Andernach (DE)

( * ) Notice: Subject to any disclaimer, the term of this patent is extended or adjusted under 35 U.S.C. 154(b) by 54 days.

(21) Appl. No.: 14/384,827

(22) PCT Filed: Dec. 18, 2012

(86) PCT No.: PCT/EP2012/076016
§ 371 (c)(1),
(2) Date: Sep. 12, 2014

(87) PCT Pub. No.: WO2013/135327
PCT Pub. Date: Sep. 19, 2013

(65) Prior Publication Data
US 2015/0050517 A1    Feb. 19, 2015

(30) Foreign Application Priority Data
Mar. 13, 2012  (DE) .................. 10 2012 102 082

(51) Int. Cl.
| | | |
|---|---|---|
| C09K 11/06 | (2006.01) | |
| B05D 5/06 | (2006.01) | |
| C09D 5/22 | (2006.01) | |
| C09D 7/12 | (2006.01) | |
| C09D 171/02 | (2006.01) | |
| B32B 15/01 | (2006.01) | |

(52) U.S. Cl.
CPC ............. *C09K 11/06* (2013.01); *B05D 5/06* (2013.01); *B32B 15/013* (2013.01); *C09D 5/22* (2013.01); *C09D 7/1241* (2013.01); *C09D 171/02* (2013.01); *B32B 2250/02* (2013.01); *B32B 2255/24* (2013.01); *Y10T 428/12556* (2015.01)

(58) Field of Classification Search
CPC ..................................................... C09K 11/02
USPC ........ 427/9, 331, 337, 157, 624; 252/301.16
See application file for complete search history.

(56) References Cited

U.S. PATENT DOCUMENTS

| | | | | |
|---|---|---|---|---|
| 6,409,850 | B1* | 6/2002 | O'Driscoll ............. | C25D 5/505 148/518 |
| 6,544,797 | B1* | 4/2003 | Buechler .............. | G01N 33/533 435/252.3 |
| 7,514,150 | B2* | 4/2009 | Spencer ............... | C10M 173/02 428/426 |
| 2005/0164895 | A1 | 7/2005 | Spencer et al. | |
| 2009/0181262 | A1* | 7/2009 | Isaksson .................. | B44C 1/00 428/626 |
| 2013/0052478 | A1* | 2/2013 | Kurokawa ............... | C25D 9/10 428/626 |

FOREIGN PATENT DOCUMENTS

| | | |
|---|---|---|
| GB | 845097 | 8/1960 |
| WO | 03089551 A2 | 10/2003 |

OTHER PUBLICATIONS

English translation of International Preliminary Report on Patentability for PCT/EP2012/076016 filed Dec. 18, 2012.
International Search Report for PCT/EP2012/076016 dated Apr. 18, 2013.
Written Opinion for PCT/EP2012/076016 for PCT/EP2012/076016, filed Dec. 18, 2012.
International Preliminary Report for PCT/EP2012/076016, dated Apr. 28, 2014.
Lee S et al: "Self-healing behavior of a polyelectrolyte-based lubricant additive for aqueous lubrication of oxide materials" Nov. 14, 2006, vol. 24, No. 3, XP019454982.
Khaled M. Al-Qudah et al: "The relationship between serum biotin and oxidant/antioxidant activities in bovine lameness", Feb. 28, 2012, vol. 92, No. 1, XP055068740.
Lee S et al: "Self-healing behavior of a polyelectrolyte-based lubricant additive for aqueous lubrication of oxide materials" Nov. 14, 2006, vol. 24, No. 3, pp. 217-223, XP019454982.
Khaled M. Al-Qudah et al: "The relationship between serum biotin and oxidant/antioxidant activities in bovine lameness", Feb. 28, 2012, vol. 92, No. 1, pp. 138-141, XP055068740.

* cited by examiner

*Primary Examiner* — Cachet Sellman
(74) *Attorney, Agent, or Firm* — Paul D. Bianco; Fleit Gibbons Gutman Bongini & Bianco PL

(57) ABSTRACT

The invention relates to a method for treating a steel band or steel plate provided with a metal coating with an after-treatment agent, which contains at least one polyalkylene glycol and is applied as a liquid solution to the surface of the metal coating. According to the invention, in order to achieve improved wetting and adhesion of the covering and at the same time the lowest possible coefficient of friction of the coated surface and in order to ensure good workability of the coated steel band or plate, the after-treatment agent contains a fluorescent antioxidant in addition to the polyalkylene glycol. The invention further relates to a steel band or steel plate provided with a metal coating, particularly a tin plate, which, on the surface of the metal coating, has a thin coat of an after-treatment agent which contains polyalkylene glycol and a fluorescent antioxidant.

17 Claims, No Drawings

METHOD FOR TREATING A STEEL BAND OR PLATE PROVIDED WITH A METAL COATING WITH AN AFTER-TREATMENT AGENT, AND A STEEL BAND OR PLATE PROVIDED WITH A METAL COATING

FIELD OF THE INVENTION

The invention concerns a method for the treatment of a steel band or plate provided with a metal coating with an after-treatment agent.

BACKGROUND OF THE INVENTION

In the production of tinplate, in particular, steel plates that are electrolytically tin-coated in tin coating systems, and in the production of electrolytically chromium-coated steel plates (electrolytic chromium coated steel, ECCS), the metallically coated steel plate is first passivated chemically or electrochemically and subsequently greased. By the greasing, the coefficient of friction of the coated steel plate is to be reduced, so as to provide for a better workability of the plate, for example, for a deep drawing or ironing process during the production of cans for foods or beverages. To this end, for example, in the production of tinplate (tin-coated steel plate) in tin-coating systems, the tin-coated and passivated sheet metal, after a cleaning and drying, is electrostatically greased with dioctyl sebacate (DOS), acetyl tributyl citrate (ATBC), or butyl stearate (BSO). The substances used for the greasing of the coated steel plate must thereby also ensure a good paint adhesion, since the coated steel plate is, as a rule, painted to improve its corrosion resistance and its resistance with respect to acids. For reasons having to do with the protection of the environment, solvent-free or low-solvent paints are now being increasingly used for the painting of steel plates provided with a metal coating. These paints make higher demands on the quality of the surface of the coated steel band with respect to paint wetting and paint adhesion.

SUMMARY OF THE INVENTION

Therefore, a goal of certain embodiments of the invention is to be found in indicating a method for the treatment of steel bands or plates that are coated with a metal coating, with which an improved paint wetting and paint adhesion and, at the same time, as low as possible a coefficient of friction can be attained, so as to ensure a good workability of the coated steel band or plate.

From GB 845 097, the use of polyalkylene glycol-containing after-treatment agents for the oiling of tinplate surfaces is known, so as to prevent a corrosion of the tin-plated surface. For this, an aqueous emulsion of a polymer, which contains a polyalkylene glycol, is applied on the surface.

In the treatment of metal-coated steel plates, such as tinplate, with a liquid after-treatment agent, it is advantageous to be able to adjust the layer thickness of the after-treatment agent applied on the surface of the coated steel plate to desired and appropriate values, so as to be able to purposefully adjust the characteristics of the treated plate surface that are influenced by the after-treatment agent. Another goal of the invention is therefore to be found in the indication of a method for the treatment of a steel band or plate provided with a metal coating, with a liquid after-treatment agent, in which, during the application of a layer of the after-treatment agent on the metal-coated surface, the applied layer thickness of the after-treatment agent can be detected and, in this way, can also be purposefully adjusted.

A method and a steel band or plate are disclosed herein. Preferred embodiments of the method and steel band or plate are also disclosed.

In the method in accordance with the invention, a steel band or plate provided with a metal coating is treated with an after-treatment agent, wherein the after-treatment agent contains at least one polyalkylene glycol and is applied as a liquid solution on the surface of the metal coating. In addition to the polyalkylene glycol, the after-treatment agent contains at least one fluorescent antioxidant. With the fluorescent antioxidant, the (ageing) stability of the polyalkylene glycol contained in the after-treatment agent is, on the one hand, increased, wherein the corrosion stability of the plate treated in accordance with the invention is increased. On the other hand, the use of the fluorescent antioxidant makes possible the detection of the layer thickness of the layer of the after-treatment agent applied on the surface of the metal coating, during the application. In this way, it is possible to adjust the applied layer thickness of the after-treatment agent to a desired and appropriate value, so as to be able to adjust the surface characteristics of the treated plate that result therefrom to the individual application case. As a result of the fluorescent antioxidant contained in the after-treatment agent, it is possible to detect the applied layer thickness of the after-treatment agent via a fluorescence spectroscopy method, in particular, via laser-stimulated fluorescence spectroscopy (LIF), during the after-treatment process.

Preferably, the antioxidant is a fluorescent hydrocarbon, in particular, phenols substituted by steric hindrance groups. Substances from the group of the ascorbic acids, in particular, L-(+)-ascorbic acid, or salts of the ascorbic acids, have proved to be a particularly preferred antioxidant. Likewise, butylhydroxytoluene (BHT) or butylhydroxyanisole (BHA) can be used as antioxidants with the method in accordance with the invention.

Appropriately, the after-treatment agent is present as an aqueous solution and is applied by means of a spray method or an immersion method on the surface of the metal-coated steel band or plate. After the application of the liquid solution of the after-treatment agent on the surface of the steel band or plate provided with the metal coating, the after-treatment agent is appropriately squeezed off by using squeezing rollers, and drying is subsequently carried out. Coating applications of the after-treatment agent with a dry application in the range of 1 to 10 mg/m$^2$, and preferably in the range of 2 to 6 mg/m$^2$, have proved to be particularly suitable. Compared with the greasing agents (DOS, ATBC, or BSO) previously used for tinplate and ECCS, the surfaces of the metal coating treated in accordance with the invention exhibit a substantially higher surface tension and thus a better paint wetting. The surface tension of traditionally greased tinplate is, for example, in the range of 32-35 mN/m, wherein the surfaces of the metal coating treated in accordance with the invention have a surface tension of more than 40 mN/m and, in particular, a surface tension in the range of 50 mN/m to 60 mN/m. The coefficient of friction of the metal coating treated in accordance with the invention is preferably below 0.3 and, in particular, at $\mu=0.10$ to 0.25.

The polyalkylene glycol contained in the after-treatment agent preferably has a molecular weight between 2000 g/mol and 20,000 g/mol and preferably between 4,000 g/mol and 10,000 g/mol. The use of polyethylene glycol (PEG) has proved to be particularly suitable. However, other polyalkylene glycols, such as polypropylene glycol or polytetramethylene glycol, can also be used. Thus, for example, polyethylene that has a molecular weight of 6000 g/mol and can be obtained under the brand name "Lipoxol® 6000" has proved to be particularly suitable with respect to paint wetting and the coefficient of friction of the treated surface.

The polyalkylene glycol contained in an aqueous solution of the after-treatment agent preferably has concentrations of 0.1 g/L to 400 g/L and preferably, between 1.0 g/L and 200 g/L in the aqueous solution. The concentration of the antioxidant in the aqueous solution is appropriately between 0.001 g/L and 4.0 g/L. The viscosity of the aqueous solution of the after-treatment agent is preferably in the range of 0.5 to 60 $mm^2/s^2$, at 20° C., and the refraction index is preferably between 1.30 and 1.40. The density of the aqueous solution of the after-treatment agent is preferably in the range of 0.9 to 1.1 $g/cm^3$.

DETAILED DESCRIPTION OF THE INVENTION

Below, the invention is explained in more detail with the aid of an embodiment example. The embodiment example thereby refers to the after-treatment of a tin-coated steel plate (tinplate). The method in accordance with the invention, however, is not limited to this application case; with all steel plates provided with a metal coating, it can be used in a corresponding manner. In particular, chromium-coated steel plates (ECCS plates) or tin-coated steel plates can be treated in an appropriate manner in accordance with the invention.

A traditional tinplate with a tin coating in the range of 1.0 $g/m^2$ to 6 $g/m^2$ was sprayed with an aqueous solution of an after-treatment agent, wherein the aqueous solution of the after-treatment agent was sprayed on the tinplate surface as uniformly as possible using spray nozzles. Subsequently, the sprayed after-treatment agent was squeezed off with squeezing rollers, and drying was carried out in a furnace. After the drying, it was possible to detect a dry layer coating of the after-treatment agent in the range of 2-6 $mg/m^2$.

For the production of an aqueous solution of the used after-treatment agent, an aqueous solution of a polyethylene glycol (PEG) with a molecular weight of 6000 g/mol was first prepared in a concentration between 0.1 g/L and 400 g/L and mixed with ascorbic acid (vitamin C) in a concentration between 0.001 g/L and 4.0 g/L. This aqueous solution was then uniformly applied in a spraying process on the surface of the tinplate.

During the application of the after-treatment agent on the surface of the tinplate, the layer thickness of the applied after-treatment agent was detected via a fluorescence spectroscopy method. For this, in particular, a laser-stimulated fluorescence spectroscopy method was used. During the application of the after-treatment agent, a laser beam is thereby directed onto the tinplate surface. The laser radiation is absorbed by the applied layer of the after-treatment agent. As a result of the fluorescent characteristics of the after-treatment agent, which contains a fluorescent antioxidant (for example, ascorbic acid), the layer of the after-treatment agent is stimulated to emit light (fluorescence) by the irradiated laser light.

Laser-stimulated fluorescence spectroscopy has proved to be a particularly suitable method for the detection of the layer thickness of the applied after-treatment agent, in which a time-integrating measurement of the decaying behavior of the fluorescence signals takes place with suitably selected wavelengths of the irradiation laser light. After every stimulation with an individual laser pulse for a specific time length of, for example, 1 ns, the decaying behavior of the fluorescence radiation emitted by the after-treatment agent layer is detected, in suitably positioned measurement windows and time-integrated, as intensity values $I_1$ and $I_2$. The ratio of these intensity values $I_2/I_1$ thereby depends on the quantity of the fluorescent substance (and thus on the concentration and the layer thickness). This makes possible, with a separation of disturbing background signals, the reliable detection of a value that is proportional to the concentration of the fluorescent antioxidant and to the layer thickness of the applied after-treatment agent. With a specific concentration of the fluorescent antioxidant in the aqueous solution of the after-treatment agent, it is possible to draw a conclusion in this way as to the layer thickness of the applied after-treatment agent.

The optical stimulation of the layer of the after-treatment agent can thereby take place, for example, with a microchip laser that, with a repetition frequency in the area of 10 kHz, emits individual laser pulses with an emission wavelength of, for example, 266 nm and 355 nm and a pulse power of typically 250 μW. The fluorescence radiation emitted by the layer of the after-treatment agent is coupled into a fiber optic cable and conducted to a detector that is coupled with an evaluation unit. The detector comprises a photomultiplier, which selectively detects the fluorescence signals with respect to wavelengths via optical filters. The detector pulses are evaluated in a time-integrated manner, and via calibration measures, are converted into the measurement parameter to be detected (here, the layer thickness of the after-treatment agent layer).

With the method in accordance with the invention, it was possible to apply and detect layer thicknesses of the after-treatment agent in a dry coating of 1-10 $mg/m^2$. The tinplate surfaces treated in this manner have surface tensions of more than 40 mN/m and, in particular, in the range of 50 to 60 mN/m. Such surface tensions are particularly suitable for the painting of tinplate surfaces with solvent-free or low-solvent paints and the paint wetting is decisively improved.

The components proposed for the after-treatment agent in accordance with the invention are all characterized by their compatibility with foods. This is particularly important for the later use of the plates treated in accordance with the invention for the production of packagings for foods, such as cans for foods or beverages.

The tinplate surfaces treated in accordance with the invention are moreover characterized by a good workability, for example, in the production of cans for foods and beverages. In this way, the machine running times, for example with stretch-bending alignment rollers for cutting systems or paintings, can also be appreciably reduced. Surprisingly, it was also shown that the tinplate surfaces treated in accordance with the invention have a brighter and shinier surface compared with the traditionally treated surfaces. This can be substantiated by a dust-repellant effect of the after-treatment agent layer applied on the tinplate surface.

Since the after-treatment agent is present as a liquid solution, the after-treatment agent can be applied on the tinplate in a simpler manner and, in particular, more advantageously and faster. This is advantageous in comparison to the traditional after-treatment agents, such as DOS or ATBC, which must be applied by using expensive and maintenance-intensive electrostatic oiling booths. On the other hand, the invention makes possible a simple and low-cost application of the liquid after-treatment agent with an immersion or spraying method, which can be readily integrated into the production cycle of electrolytic band coating systems. In this way, the application of the liquid after-treatment agent on a steel band that is moved at a high band moving speed of up to 750 m/min through a band coating system is also possible.

The invention claimed is:

1. A method for the treatment of a steel band or steel plate provided with a metal coating with a post-treatment agent, which contains at least one polyalkylene glycol and which is applied as a liquid solution on the surface of the metal coating, wherein in addition to the polyalkylene glycol, the post-treatment agent contains a fluorescent antioxidant.

2. The method according to claim 1, wherein the antioxidant is a fluorescent hydrocarbon, in particular, phenols substituted by steric hindrance groups.

3. The method according to claim 1, wherein the antioxidant is an ascorbic acid or a salt of the ascorbic acid.

4. The method according to claim 3, wherein the antioxidant is L-(+)-ascorbic acid or a salt thereof.

5. The method according to claim 1, wherein the antioxidant is butylhydroxytoluene (BHT) or butylhydroxyanisole (BHA).

6. The method according to claim 1, wherein the post-treatment agent is present as an aqueous solution, wherein the concentration of the polyalkylene glycol in the aqueous solution is between 0.1 g/L and 400 g/L.

7. The method according to claim 1, wherein the molecular weight of the polyalkylene glycol is between 2000 g/mol and 20,000 g/mol.

8. The method according to claim 1, wherein the polyalkylene glycol is polyethylene glycol (PEG).

9. The method according to claim 8, wherein the polyethylene glycol (PEG) has a molecular weight of 6000 g/mol.

10. The method according to claim 1, wherein the post-treatment agent is present as an aqueous solution, wherein the concentration of the antioxidant in the aqueous solution is between 0.001 g/L and 4.0 g/L.

11. The method according to claim 1, wherein after the application on the surface of the steel band or plate provided with the metal coating, the liquid solution of the post-treatment agent is squeezed off with squeezing rollers and subsequently, a drying is carried out.

12. The method according to claim 11, wherein after the drying on the surface of the metal coating, a layer of the after-treatment agent is present with a dry coating in the range of 1 to 10 mg/m$^2$.

13. The method according to claim 11, wherein the surface tension of the treated surface of the metal coating is greater than 40 mN/m.

14. The method according to claim 1, further comprising measuring layer thickness of the post-treatment agent during the application of the post-treatment agent on the surface of the metal coating.

15. The method according to claim 14, wherein the layer thickness of the applied post-treatment agent is detected by a fluorescence spectroscopy method.

16. A steel band or steel plate, provided with a metal coating, having a thin coating of a post-treatment agent on the surface of the metal coating, wherein the post-treatment agent contains at least one polyalkylene glycol and a fluorescence antioxidant.

17. The method according to claim 1, wherein the antioxidant comprises phenols substituted by steric hindrance groups.

\* \* \* \* \*